March 2, 1965 J. A. CROSS ET AL 3,171,887

SHIELDING AND SEALING GASKET CONSTRUCTION

Filed Jan. 16, 1963 2 Sheets-Sheet 1

INVENTORS
James A. Cross
Eugene Lambeau
BY
Hill, Sherman, Meroni, Gross & Simpson
ATTORNEYS

SHIELDING AND SEALING GASKET CONSTRUCTION

Filed Jan. 16, 1963 2 Sheets-Sheet 2

INVENTOR.
James A. Cross
Eugene Lambeau
BY Hill, Sherman, Meroni, Gross & Simpson
ATTORNEYS United States Patent Office 3,171,887

Patented Mar. 2, 1965

3,171,887
SHIELDING AND SEALING GASKET CONSTRUCTION

James A. Cross, Skokie, and Eugene Lambeau, Des Plaines, Ill., assignors to The Pyle National Company, Chicago, Ill., a corporation of New Jersey
Filed Jan. 16, 1963, Ser. No. 251,815
6 Claims. (Cl. 174—35)

This invention relates generally to gaskets and more particularly to multi-purpose gaskets for use with electrical connectors requiring close tolerances of electrical and environmental integrity.

In the manufacture of many types of electrical equipment it is desirable or even essential to electrically connect various conductors in one component to corresponding conductors in another component, the two components being separated by a panel or partition wall. The connection between the mutually corresponding conductors is often preferably accomplished by means of a line connector of the type having male and female contact members, portions of the connector extending through the wall or panel separating the components.

Many electric circuits in modern equipment require a high order of environmental and electrical integrity, such as signal circuits in electronic equipment and the like. By this is meant the circuit must be free of outside mechanical and electrical influence from whatever source so as to conduct a dependable and accurate electrical impulse.

For the purpose of connecting electrical conductors requiring a high degree of integrity various line connectors of the hermaphrodite or combination male and female type have been developed. Such connectors are generally provided with a thin, hard covering of dielectric material around the outer portion of the casing to preclude the admission of fugitive or stray electrical waves or impulses into the interference free environment within the connector.

Further, to ensure mechanical integrity within the connector, various mechanical gaskets are generally used within the connection portions of the connector to preclude admission of dirt, moisture and other foreign matter into the interference-free environment within the connector.

Where electrical conductors are passed through a partition wall or the like to connect adjoining components, and are connected at either side of the wall by means of a line connector, it is often necessary to provide a mechanical interference-free environment within one component and surrounding the connector disposed within that component. Therefore, an opening or aperture must be provided in the wall for passing the line connector therethrough, and means must be provided to adequately seal off and isolate from each other both sides of the wall in the area surrounding the opening.

To prevent moisture, dirt, gases and other foreign matter from entering the mechanically interference-free or protected compartment, gasket means can be used to surround the opening in the wall and to engage the connector and wall in leak-proof relation to prevent such admission. Materials suitable for such leak-proof gasketing are normally non-metallic and electrically non-conductive.

However, in certain applications of the above mentioned type, it is necessary to provide electrical circuitry between the casing of the connector and the wall through which it passes, for example, when a "grounding" effect is required. The problem of providing electrical continuity or circuitry between the connector and wall appears appreciable when it is understood that although the most suitable material for isolating foreign matter is non-conductive, as mentioned above, the gasket should desirably provide means to interconnect the wall and connector electrically.

Certain applications of electrical circuitry using line connectors passing through walls provide for electric circuits having extremely weak signals measured in terms of microamps and microvolts. Such signals are particularly sensitive to interference from outside electrical impulses such as radio waves, which can deleteriously affect their function. One area of vulnerability to the signal as a result of such outside electrical waves or impulses can be in the area of whatever means are used in the gasket to provide electrical circuit continuity between the casing of the connector and the partition wall due to the necessary omission of the thin, hard cover of dielectric material in this area.

It is, therefore, an important object of this invention to provide gasket means for use in applications involving mounting of a line connector through a wall separating isolated compartments to prevent gases, dirt, moisture and other foreign matter from circulating from one compartment to the other.

Another object of the present invention is to provide gasket means to produce electric circuit continuity between the casing of the connector and an electrically conductive partition wall while maintaining good sealing capabilities.

Another object of the present invention is to provide gasket means to intercept and render ineffective radio waves or the like directed toward a wall opening through which passes a line connector from one isolated compartment to another while maintaining good sealing capabilities and maintaining electric circuit continuity between the casing of the connector and the wall.

Another object of the present invention is to provide a gasket means which is simple in construction, inexpensive in manufacture, flexible in use, efficient in operation and requires little space.

Many other features, advantages and additional objects will become manifest to those versed in the art from the detailed description of the invention which follows.

Although the principles of the present invention find utility in many assemblies requiring leak-proof relation between parts, this invention finds particular utility when used in connection with a line connector mounted through an opening of a partition wall separating two compartments. One type of line connector embodying the present invention is illustrated herein as a hermaphrodite multi-pin or multi-contact connector assembly having a pair of complementarily shaped, separable male and female contact carrying portions, each portion having a plurality of male and female contacts similarly arranged and radially and circumferentially spaced for mating engagement with an opposite number of corresponding male and female contacts carried by the other portion.

Figure 1:
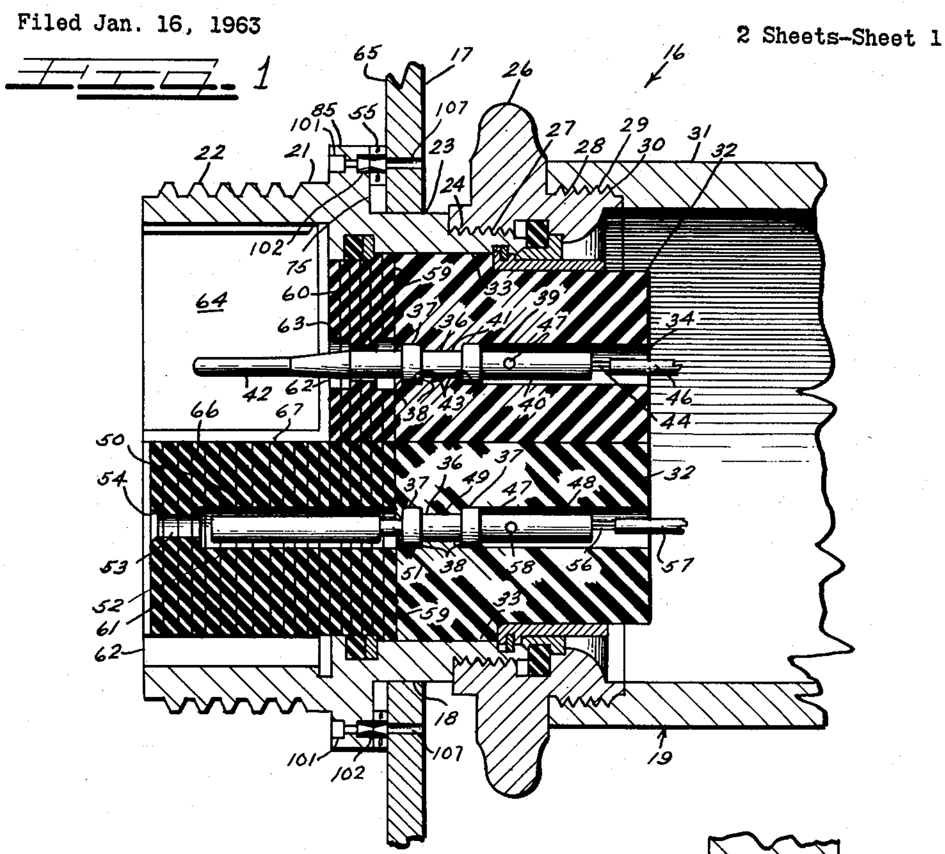
FIGURE 1 is an elevational sectional view of a line connector mounted in a partition wall or panel opening and separated from the wall by a gasket assembly employing the principles of the present invention.

One portion or substantially one-half of a hermaphrodite connector of the type described is illustrated at 16 in FIGURE 1 and comprises generally a conductor housing component indicated at 19 and a contact housing component indicated at 20.

The contact housing component 20 is particularly characterized as comprising a hollow tubular body portion 21 externally threaded as at 22 to receive an internally threaded collar nut (not shown) and having an axially projecting cylindrical extension 23 which is externally threaded as at 24.

Surrounding the cylindrical extension 23 of the contact housing 20 is a nut 26 characterized by an internally threaded portion 27 which is engaged in threaded relation with the extension 23 of the contact housing 20, and an externally threaded portion 28 which is engaged in threaded relation as at 29 with an internally threaded end portion 30 of a cylindrically shaped axially extending wall 31 of the conductor housing 19.

The contact housing 20 is further characterized by the utilization of a plurality of mounting members 32 which constitute a mass of elastic material such as rubber or a rubber compound and which assume a generally cylindrical configuration to fit snugly within an inner wall 33 of the cylindrical extension 23. The mass of elastic material constituting the members 32 is shaped to form a plurality of circumferentially and radially spaced through openings as at 34, each opening having an irregularly-shaped bore wall as at 36 prescribing longitudinally spaced grooves as at 37 and shoulders as at 38.

Mounted within some of the openings 34 formed in members 32 are current-continuing male contact members generally indicated as at 39, each having a body portion as at 40, a middle portion as at 41 and an axially extending pin portion as at 42. The middle portions 41 of the contact members 39 comprise a plurality of radially enlarged circumferentially continuous ribs 43 and are shaped complementarily to that portion of the resilient mounting members 32 defining the bore wall 36 and the spaced grooves 37 of the through openings 34. Insertion of the contact members 39 into the mounting members 32 is made by pop-in assembly and is accomplished by applying an axial force to the contact members in the direction of the longitudinal axis of the through openings 34, thereby deformably displacing the shoulders 38 of the mounting members 39 and permitting the middle portions 41 of the contact members 39 to move past the shoulders 38, thereby placing the contacts 39 into a resiliently snug close fit relation with the through openings 34.

The body portions 40 of the male contact members 39 have axially extending recesses defined thereby to receive the bared ends as at 44 of sheathed conductor wires as at 46. The body portions 40 are then crimped to place the conductor wires 44 in firm assembly with the male contact members 39. Peep holes as at 47 are formed in the body portions 40 to provide visual inspection of the wires 46 in the body portions 40 to ensure satisfactory assembly. Although crimping affords an excellent means of attachment of the wires 46 to the body portions 40, it will be appreciated that any suitable connection such as soldering or other connecting means may be used.

Housed within the remaining through openings 34 in the mounting members 32 are female current-carrying members generally indicated as at 47, each comprising a body portion 48, a middle portion 49, and a male pin receiving portion or socket 50. The middle portions 49 of the female members 47 comprises a plurality of spaced ribs 51 similar to the ribs 43 of the male members 39 and adapted for snug resilient engagement with the corresponding grooves 37 and shoulders 38 of the through openings 34.

The male pin receiving portions 50 comprise a cylindrically shaped axially extending hollow portion 52 adapted to receive in mating engagement the pin portion of a corresponding male current-carrying member of the second portion (not shown) of the connector's assembly. A hollow stem 53 of the receiving portions 50 is flared as at 54 for accommodating insertion of the corresponding mating male member into the hollow portions 52. The body oprtions 48 have axially extending recesses defined thereby to receive the bared ends 56 of sheathed wires as at 57. The body portions are crimped to place the wires 57 in firm assembly with the female contact members 48, which also have inspection peep holes as at 58.

Also mounted within the contact housing component 20 adjacent a radially extending flat surface 59 of the mounting members 32 are carrying members as at 60 and 61 which may comprise a mass of laminated disc-like members having insulating properties but generally having less yieldability than the mass of elastic material comprising the mounting members 32. As illustrated in FIGURE 1, the carrying member 60 surrounding the male contact member 39 extends axially from the surface 59 of the mounting member 32 to a radially extending flat surface 62 of a rib 63 of the male member 39. A hollow chamber 64 is defined by the body portion 21 of the contact housing 20 and surfaces 66 and 67 of carrying members 60 and 61 respectively, and it will be understood that a complementarily shaped carrying member of the other portion (not shown) of the connector assembly is adapted to be received within the chamber 64 for engaging in mating relation a corresponding female current-carrying member carried by the other portion of the connector assembly.

The carrying member 61 surrounds the receiving portion 50 of the female current-carrying member 47 and extends axially from the surface 59 of the mounting member 32 substantially to an end wall 62 of the contact housing 20. It will be understood that a carrying member of the other portion (not shown) of the connector assembly is adapted to abut the carrying member 61 in assembled relation.

The female current-continuing member 47 is adapted to receive a corresponding male member carried by the other portion, and the two portions of the connector assembly are adapted to be connected by means of a collar nut (not shown) threadedly engaged at 24 to the threaded extension 23 of the contact housing 20 and to a corresponding threaded extension of the contact housing of the other half of the connector assembly to connect both halves in fixed assembled relation.

FIGURE 1 illustrates the gasket of the present invention, indicated generally by reference numeral 55, mounted in assembled relation between a flat surface 65 of the partition wall 17 and a flat radially extending surface 75 of a circumferentially continuous flange or shoulder 85 projecting radially outwardly from the body portion 21 of the contact housing 20. In order to secure the illustrated portion 16 of the connector assembly to the grounded partition wall 17 in tight fastened assembly a plurality of electrically conductive bolt means (not shown) are disposed circumferentially around a flange 85 and are inserted within a series of concentrically aligned apertures defined by the flange 85, the gasket 55 and the partition wall 17.

As previously described, the entire outer surface of the connector assembly is covered by a thin, hard coat of dielectric material capable of preventing stray electrical waves or impulses emanating from an external source to enter the connector assembly, thereby affecting the electric signals of the wire conductors housed within the connector assembly. To establish electrical conductivity between the electrically conductive housing of the connector assembly and the electrically conductive, grounded partition wall, an area of the outer surface of the connector may be freed of dielectric material. This dielectric-free area comprises certain portions of the flange 85 through which pass the electrically conductive bolt (not shown) securing the line connector and the partition wall in connected assembly. By the present invention the connector is provided with special means to protect the connector against stray electrical impulses by absorbing and transmitting such impulses to the grounded partition wall to negate their deleterious effect.

Three distinct functions are preformed by the gasket structure of the present invention. The first function is to prevent the passage of dirt, moisture, gases and other foreign matter through the opening 18 formed in the partition wall 17 through which the extension 23 of the connector 16 passes. The second function is to establish electrical conductivity between the electrically conductive housing of the line connector and the electrically conductive grounded partition wall. The third function is to intercept stray radio waves or other electrical impulses surrounding the connector and to ground such impulses to the partition wall, thereby insuring the electrical integrity of the connector.

Figure 2:
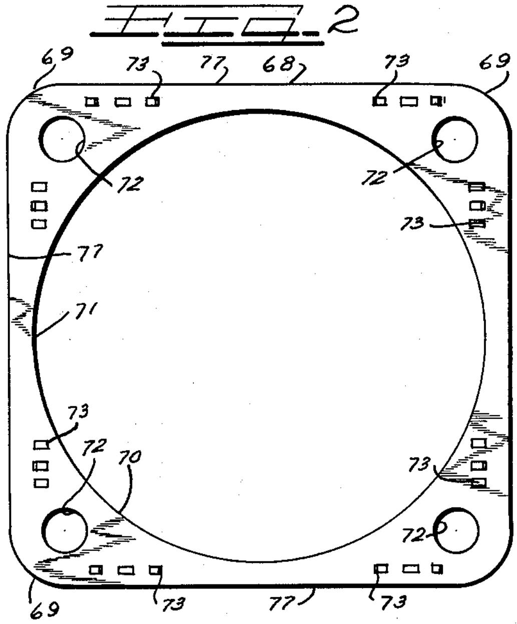
FIGURE 2 is a front view of a conductive center plate of the present invention forming one component of the gasket assembly.

Referring now to FIGURE 2, the gasket of the present invention comprises a generally rectangularly shaped electrically conductive center plate 68 having arcuately formed corner portions 69 and a circularly shaped aperture as at 70. Aperture 70 is defined by an inner wall 71 which, in the generally square embodiment of the center plate 68 illustrated in FIGURE 2, is centrally located. Formed in the center plate 68 and disposed radially inwardly from each of the four corner portions 69 are a plurality of circularly shaped bolt holes as shown at 72.

The center plate 68 comprises the middle portion of the gasket 63 and when the gasket is mounted in place as illustrated in FIGURE 1, this plate effectively intercepts and absorbs electrical impulses at frequencies such as radio waves or the like and normalizes any such waves by conveying their converted energy to the grounded partition wall 17. For this purpose, a plurality of stubs or tangs 73 are illustrated extending outwardly from faces 74 and 76 of the plate 68 and arranged parallel to the perimeter of an outer wall 77 of the plate 68 and marginal thereto.

Figure 3:
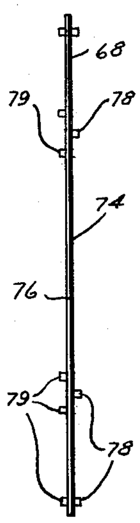
FIGURE 3 is an end view of the center plate of FIGURE 2.

It will be apparent that the number of tangs 73 formed in the center plate 68 can be varied but in the embodiment illustrated in FIGURE 2 a total of 24 tangs are provided. The tangs 73 are arranged in groups of 3, and within each group two tangs project from one face of the plate 68 and one tang projects from the other face thereof. This is best illustrated in FIGURE 3, wherein tangs 78 are shown extending in one direction relative to the center plate 68 and tangs 79 extend in the opposite direction. Any radio waves or other electrical frequencies absorbed by the center plate 68 will be electrically communicated through tangs 73 to the electrically conductive grounded partition wall 17, thereby producing a normalizing effect on said waves.

Figure 4:
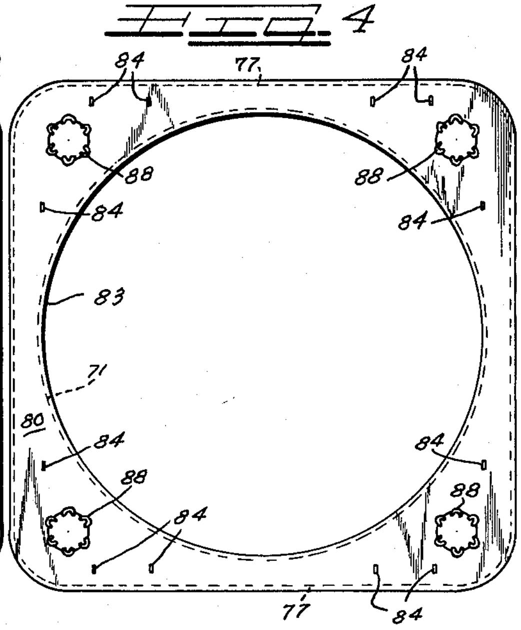
FIGURE 4 is a front view of a gasket assembly of the present invention.
Figure 5:
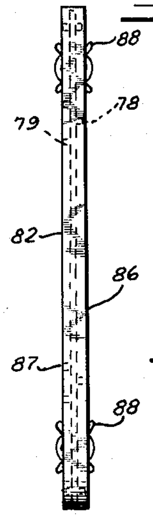
FIGURE 5 is an end view of the assembly of FIGURE 4.

In order to prevent the leakage of dirt, moisture and other foreign matter past the gasket 63 and through the opening 18 formed in the partition wall 17, the non-resilient center plate 68 is substantially enveloped within a resilient, dielectric outer cover 80. Any suitable material may be used to constitute the cover 80, but in the illustrated embodiment of the invention this cover comprises a pair of thin rubber sheets bonded to either side of the center plate 68. As is shown in FIGURES 4 and 5, rubber sheets 81 and 82 define a centrally disposed aperture as at 83 disposed in concentric alignment with aperture 70 defined by the center plate 68. To insure complete encasement of the center plate 68 within the outer cover 80, aperture 83 has a diameter which is slightly less than the diameter of aperture 70 of the center plate 68 and rubber sheets 81 and 82 are bonded together at the periphery of aperture 83. Further, sheets 81 and 82 extend outwardly beyond and slightly overlap the center plate 68 and are bonded together at the outer perimeter thereof.

Referring to FIGURE 1, it will be apparent that an axial pressure applied to the flange 85 of the contact housing 21 in the direction of the partition wall 17 will tend to compress the gasket 55 in leak-proof engagement with the flange 85 and the wall 17 and any radial forces acting on gasket 55 will be prevented from dislodging or otherwise moving the center plate 68 from its normal position within the outer cover 80 by the bonded-together relation of rubber sheets 81 and 82 at the inner periphery of aperture 83 and along the outer perimeter of the center plate 68.

As illustrated in FIGURE 5, rubber sheets 81 and 82 have a free state thickness which is greater than the projected distance which tangs 73 extend from the center plate 68. For this reason, sheets 81 and 82 are formed with apertures as at 84 located adjacent each of the tangs 73. As the contact housing 20 is securely drawn up toward partition wall 17 by means of securing bolts (not shown), sheets 81 and 82 are pressed into a state of compression sufficiently so that tangs 73 will project through apertures 84 to outer faces 86 and 87 of the sheets 81 and 82 to abut in pressing relation the flange 85 of the contact housing 21 and the partition wall 17. Electrical continuity is thereby established between the center plate 68 and the partition wall 17.

Figure 8:
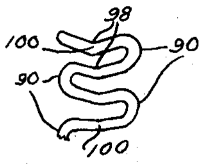
FIGURE 8 is an elevational side view of a wire spring of the present invention after it has been serpentined, crimped, cut and circularly shaped for mounting in a gasket assembly.
Figure 6:
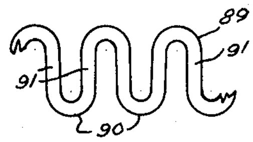
FIGURE 6 is a fragmentary view of a special spring of the present invention after the spring wire is serpentined but before it is crimped.
Figure 7:
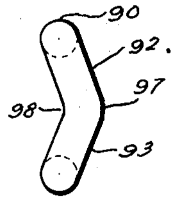
FIGURE 7 is an elevational sectional view of the spring wire of FIGURE 6 after it has been crimped.
Figure 9:
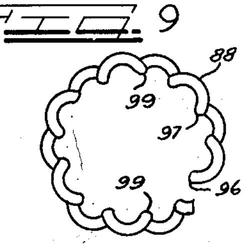
FIGURE 9 is a front elevational view of a wire spring of FIGURE 8.

To provide a low resistance electrical conductivity between the partition wall 17 and the flange 85, a plurality of wire springs 88 are carried in bolt holes 72 of the center plate 68 and each comprises a wire strand or a wire form member 89 serpentined as illustrated in FIGURE 6 to form longitudinally spaced arcuately shaped loops as at 90 and transverse interconnecting body portions as at 91. The serpentined strand 89 is longitudinally axially crimped as illustrated in FIGURE 7 to form obtuse axially transverse fingers 92 and 93. The crimped strand 89 is circularly shaped as illustrated in FIGURE 9, and has two circumferentially spaced end portions 94 and 96. Inner and outer apex surfaces 97 and 98 define circumferentially spaced locus points of an inner contact circle as at 99 (FIGURE 9) and an outer contact circle as at 100 (FIGURE 8). To mount springs 88 in bolt holes 72, end portions 94 and 96 are pressed together in abutting relation by a force easily exerted by finger pressure, thereby producing an overall diameter of springs 88 which is less than the diameter of the bolt holes 72. The springs are then inserted into the bolt holes 72 and the end portions 94 and 96 are thereafter released to resiliently expand springs 88 into snug pressing engagement with the center plate 68.

Figure 10:
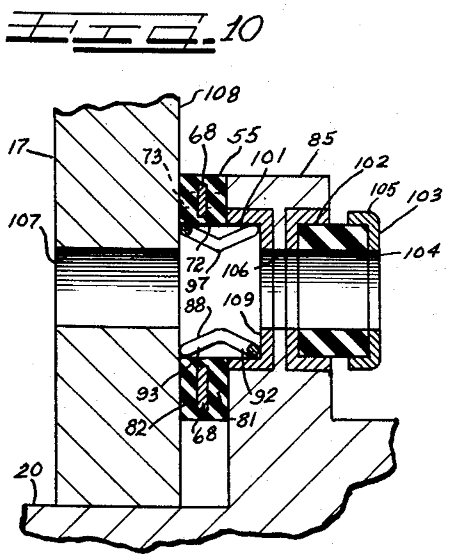
FIGURE 10 is a fragmentary cross-sectional view of a gasket of the present invention mounted in place in a connector-partition wall assembly and illustrates a corner area of the gasket including a bolt hole.

The flange 85 is characterized as defining a plurality of cylindrically shaped, circumferentially spaced, oppositely opening recesses 101 and 102. Referring to FIGURE 10, an enlarged fragmentary view of a portion of the cross-sectional view of FIGURE 1 is illustrated showing the gasket 55 of the present invention interposed between the partition wall 17 and flange 85 of the contact housing 20. A seal washer 103 having a short sleeve 105 mounted thereon is carried within the recess 102 and has a centrally disposed axially extending bolt hole as at 104 arranged in concentric alignment with a bolt hole 106 defined by the flange 85 intermediate the recesses 101 and 102. The partition wall 17 also defines a bolt hole 107 which is concentrically aligned with bolt holes 104 and 106 and, in association with these bolt holes, defines a cylindrically shaped, longitudinally extending bolt hole for receiving a clamping means, such as a bolt, to affix the flange 85, the partition wall 17 and the gasket 55 in tight clamping assembly.

The aperture 72 defined by the gasket 55 for carrying the wire spring 88 is aligned in registry with the recess 101. The spring 88 has an axial thickness greater than the thickness of the gasket 55, and with the gasket 55, the flange 85 and the partition wall 17 pressed into a clamped assembly as illustrated in FIGURE 10, the center line of the spring 88 is offset from the center plate 68 of the gasket 55, being displaced into snug abutting relation with a surface 108 of the wall 17 and the radially extending surface 109 of the recess 101. The locus of the inner apex surfaces 97 of the spring 88 substantially define a circle having a diameter equal to and in alignment with the bolt holes 104, 106 and 107 such that when a bolt (not shown) is inserted through the various bolt holes and drawn up to provide a clamping action the inner apex surfaces 97 will engage the shank of the bolt in abutting relation.

As shown in FIGURE 10, the tangs 73 projecting from the center plate 68 extend outwardly through the apertures 84 formed in the rubber sheets 81 and 82 surrounding the plate 68, and are pressed into abutting engagement with the wall 17 and the flange 85 when the gasket is in a state of compression.

Figure 11:
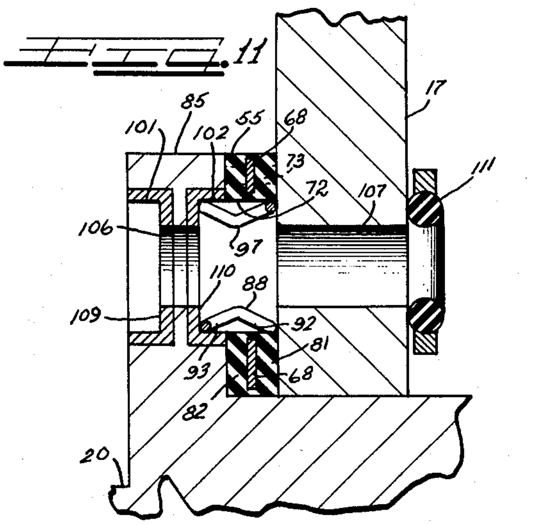
FIGURE 11 is similar to FIGURE 10 but shows the gasket of the present invention disposed on the opposite side of the partition wall.

Referring to FIGURE 11, an alternate arrangement of partition wall 17, gasket 55 and flange 85 is shown wherein the partition wall 17 is disposed on an opposite side of the flange 85. The spring 88 is now in abutting relation with the radially extending surface 110 of the recess 102 and a seal washer 111 is disposed circumferentially around the bolt hole 107 defined by the partition wall 17. It will be understood, therefore, in comparing FIGURES 10 and 11 that the gasket 55 of the present invention finds utility regardless of either location of the partition wall 17 relative to the flange 85.

It will be apparent, therefore, that the gasket 55 provides a pair of resilient, dielectric sealing surfaces to effectively prevent any foreign matter from passing between the line connector flange 85 and the wall 17. Further, the center plate 68 and the tangs 73 provide a means to intercept any outside or fugitive radio waves or the like passing between the flange 85 and the wall 17 and attempting to enter the contact housing 20 through any unprotected surfaces of the housing. In addition, electric conductivity is insured between the flange 85 and the wall 17 by means of the wire springs 88, such conductivity being produced without any reduction in the sealing capabilities of the gasket.

Although minor modifications of the present invention might be suggested by those versed in the art, it should be understood that we wish to embody within the scope of the patent warranted hereon all such modifications as reasonably come within the scope of our contribution to the art.

We claim as our invention:

1. A gasket for sealing two spaced electrically conductive clamping surfaces comprising:
- a metal center plate,
- a sheet of resilient material affixed to each face of said plate,
  - said plate and said sheets being centrally apertured and having bolt holes therein disposed radially outwardly of the central aperture, and
- electrically conductive resilient members carried by said plate in said bolt holes having portions projecting from opposite sides of said gasket to form a current continuing means between said surfaces.

2. A gasket assembly for sealing two spaced electrically conductive confronting surfaces comprising:
- a center plate having bolt holes formed therein for receiving clamping bolts,
- a resilient cover enveloping said plate and having bolt holes formed therein in registry with said holes of said plate, and
- electrically conductive spring means removably carried by said plate in said holes and having portions extending outwardly from opposite sides of said cover for engaging said confronting surfaces in abutting relation to form a current continuing means between said surfaces.

3. A gasket assembly for sealing two spaced electrically conductive confronting surfaces comprising:
- a metal center plate having a circular opening formed therein,
- a sheet of resilient material firmly affixed to each face of said plate and having a circular opening formed therein in concentric registry with said opening formed in said plate,
  - said plate having a plurality of spaced metal tangs extending laterally from each face thereof,
  - said sheet having apertures formed therein adjacent each of said tangs,
  - said sheets overlying the perimeter of said plate and the periphery of said opening of said plate,
  - said sheets being bonded together at the perimeter of said plate and at the periphery of said opening formed in said plate, and
- a resilient metal spring member carried by said plate and extending laterally from each face thereof,
  - said tangs and said spring members extending sufficiently from opposite sides of said sheets to abuttingly engage said confronting surfaces for promoting circuit continuity between said surfaces without deteriorating the sealing capability of said assembly.

4. A gasket assembly for sealing two electrically conductive surfaces secured together in assembled relation by bolt means, said assembly comprising:
- a center plate having a plurality of bolt holes formed therein,
- a sheet of rubber bonded to each face of said plate for sealing said surfaces and having bolt holes formed therein in registry with said bolt holes formed in said plate, and
- metal springs carried by said plate respectively in said bolt holes,
  - each of said springs comprising an annularly shaped wire strand having a longitudinal axis disposed substantially perpendicularly to the faces of said plate,
  - said springs being radially resiliently yieldable for maintaining snug pressing engagement with said plate and being axially resiliently yieldable for maintaining snug pressing engagement with said surfaces to promote current continuity between said surfaces.

5. A gasket assembly for sealing two electrically conductive surfaces secured together in assembled relation by a plurality of bolts, said assembly comprising:
- a centrally apertured generally rectangularly shaped electrically conductive metallic center plate for intercepting radio waves and the like impulses,
- a plurality of metal tangs projecting substantially laterally from opposite faces of said plate and disposed substantially marginally along the outer perimeter of said plate,
- a pair of rubber sheets having a free state thickness and a compressed state thickness which is less than the free state thickness and bonded respectively to the opposite faces of said center plate for sealing said surfaces to prevent foreign matter from passing therebetween, said center plate and said sheets being centrally apertured and having bolt holes formed therein respectively at each of their four corner portions for receiving the securing bolts, said sheets having a plurality of apertures formed therein shaped complementarily to said tangs and disposed respectively adjacent each of said tangs for providing passageways through which said tangs project when said sheets are in a compressed state to engage said surfaces in snug pressing relation for communicating radio waves and the like impulses from said center plate to said surfaces, a plurality of electrically conductive metal springs carried by said plate respectively in each of said bolt holes, each of said springs having a longitudinal axis disposed substantially perpendicularly to the opposite faces of said plate and comprising an annularly shaped serpentined wire strand having a plurality of axially extending circumferentially spaced crimped body portions and a plurality of loop portions interconnecting said body portions at opposite ends thereof and disposed laterally outwardly from the outside faces of said sheets and being axially resiliently yieldable for engaging said surfaces in snug pressing relation to promote current continuity between said surfaces.

6. In combination with an electrically conductive apertured partition wall for separating compartments, a line connector having a high degree of electrical and mechanical integrity extending through the aperture of said wall and having a radially outwardly extending circumferentially continuous electrically conductive flange surrounding the aperture of said wall, said connector carrying a plurality of electrical contact members therein for connecting electrical conductor wires located at opposite sides of said wall, said wall and said flange having a plurality of fastener openings, a gasket assembly for mounting between said flange and said wall around said aperture, said gasket assembly comprising a center plate, a resilient cover enveloping said plate in sealing engagement with said flange and said wall to prevent foreign matter from passing between said flange and said wall, said plate and said cover having fastener openings formed therein in registry with said fastener openings formed in said flange and said wall, and electrically conductive spring means carried by said plate in said fastener openings and having portions extending outwardly from opposite sides of said cover engaging said flange and said wall in abutting relation to form a current carrying means between said flange and said wall, whereby said gasket assembly may be clamped between said flange and said wall.

References Cited by the Examiner

UNITED STATES PATENTS

| | | | |
|---|---|---|---|
| 2,640,118 | 5/53 | Werner. | |
| 2,674,644 | 4/54 | Goodloe | 174—35 |
| 2,796,457 | 6/57 | Stinger | 174—35 |
| 2,885,459 | 5/59 | Pulsifer et al. | 174—35 |
| 3,126,440 | 3/64 | Goodloe | 174—35 |

DARRELL L. CLAY, *Primary Examiner.*

JOHN P. WILDMAN, E. JAMES SAX, *Examiners.*